(12) United States Patent
McGowan et al.

(10) Patent No.: US 8,548,085 B2
(45) Date of Patent: Oct. 1, 2013

(54) MULTI-CARRIER PEAK POWER REDUCTION IN FREQUENCY HOPPING SYSTEMS

(75) Inventors: Neil McGowan, Stittsville (CA); Marthinus Willem Da Silveira, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 13/162,748

(22) Filed: Jun. 17, 2011

(65) Prior Publication Data
US 2012/0320948 A1 Dec. 20, 2012

(51) Int. Cl.
*H04B 7/02* (2006.01)
*H04L 1/02* (2006.01)

(52) U.S. Cl.
USPC .................. 375/267; 375/132; 375/295

(58) Field of Classification Search
USPC .................. 375/132, 260, 267, 295
See application file for complete search history.

(56) References Cited

U.S. PATENT DOCUMENTS

| | | | |
|---|---|---|---|
| 6,236,864 B1 | 5/2001 | McGowan et al. | |
| 6,687,511 B2 | 2/2004 | McGowan et al. | |
| 6,931,053 B2 | 8/2005 | McGowan | |
| 7,751,786 B2 | 7/2010 | McCallister et al. | |
| 7,817,733 B2 | 10/2010 | Carsello | |
| 7,873,116 B2 * | 1/2011 | Okada et al. | 375/295 |
| 2003/0026351 A1 * | 2/2003 | Hunton | 375/295 |
| 2003/0086507 A1 * | 5/2003 | Kim et al. | 375/297 |
| 2005/0201180 A1 | 9/2005 | Naguib et al. | |
| 2007/0254592 A1 | 11/2007 | McCallister et al. | |
| 2009/0097581 A1 * | 4/2009 | McCallister et al. | 375/260 |
| 2010/0027690 A1 * | 2/2010 | Liang et al. | 375/260 |
| 2010/0150256 A1 | 6/2010 | Morris | |

FOREIGN PATENT DOCUMENTS

| | | |
|---|---|---|
| EP | 1469648 A1 | 10/2004 |
| WO | WO0209373 A2 | 1/2002 |
| WO | WO2009138423 A1 | 11/2009 |

OTHER PUBLICATIONS

Wang, Chin-Liang et al., "An Improved Peak-to-Peak Power Ratio Estimation Scheme for OFDM Systems", IEEE VTS Vehicular Technology Conference. Apr. 1, 2007, pp. 1-5.
PCT/IB2012/053036 PCT International Search Report, Sep. 11, 2012.

* cited by examiner

*Primary Examiner* — Chieh M Fan
*Assistant Examiner* — Freshteh N Aghdam
(74) *Attorney, Agent, or Firm* — David J. Rahmer; Ericsson Canada Inc.

(57) ABSTRACT

Peak power reduction in transmit chains of frequency hopping, multi-band radiocommunication devices is performed. Filtering and, optionally, interpolation of a signal being processed for peak power reduction can be performed only in an error signal path or in both an error signal path and a primary signal path. Alternatively, a sufficiently high sample rate can be used in support of error signal generation.

22 Claims, 12 Drawing Sheets

MULTI-CARRIER PEAK POWER REDUCTION IN FREQUENCY HOPPING SYSTEMS

TECHNICAL FIELD

The present invention generally relates to radio communication systems, devices and methods and, more particularly, to mechanisms and techniques for peak power reduction in frequency hopping systems, devices and methods.

BACKGROUND

At its inception radio telephony was designed, and used for, voice communications. As the consumer electronics industry continued to mature, and the capabilities of processors increased, more devices became available use that allowed the wireless transfer of data between devices and more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users (and with more tolerable delay).

Even as new network designs are rolled out by network manufacturers, future systems which provide greater data throughputs to end user devices are under discussion and development. For example, the 3GPP Long Term Evolution (LTE) standardization project is intended to provide a technical basis for radiocommunications in the decades to come. Among other things of note with regard to LTE systems is that they will provide for downlink communications (i.e., the transmission direction from the network to the mobile terminal) using orthogonal frequency division multiplexing (OFDM) as a transmission format and will provide for uplink communications (i.e., the transmission direction from the mobile terminal to the network) using single carrier frequency division multiple access (FDMA).

Radiocommunication devices designed in accordance with the newer LTE standard, as well as those designed in accordance with other standards, may have to contend with high Peak to Average Power Ratio (PAPR) issues in their transmit chains. For example, radiocommunication devices which transmit on multiple carriers (frequencies) may generate compound signals having high PAPR which propagate through their transmit chain. In order to meet out-of-band emissions requirements, which may be imposed by the various radiocommunication standards, a power amplifier (and other components) which receives such compound signals and amplifies them prior to transmission needs to provide good linearity across a large dynamic range. This requirement makes power amplifiers used in such radiocommunication devices more expensive.

Accordingly, Peak Power Reduction (PPR) mechanisms and techniques have been implemented to reduce peak power in signals prior to their reaching, for example, the power amplifier. One approach which is sometimes used to reduce the peak power of an input waveform is to implement power clipping. In the power clipping approach, whenever the amplitude of the input signal is lower than a predetermined threshold, the input signal is passed to the output unchanged, and whenever the amplitude of the input signal exceeds the threshold, the output signal is clamped to the threshold level. Of course, the clipping operation destroys some of the information contained in the original signal. However, the user should be able to tolerate this loss of information as along as the threshold is kept sufficiently high.

Decresting is another approach for reducing the peak power of an input waveform, while avoiding the overshooting problems caused by the baseband filter in the power clipper. In this approach, an error signal is created that represents the amount by which the input signal exceeds a threshold. This error signal is then subtracted from the original input signal in order to form a decrested output signal.

Tone reservation is another method used to reduce the peak power of a signal, which method is typically used when an input signal is a multi-carrier signal or a multi-tone signal. In this method, the peak power is reduced by selecting or reserving a subset of a plurality of frequencies that constitute a multi-carrier symbol. These selected or reserved frequencies are used to create an appropriate impulse function, which is scaled, shifted, rotated and subtracted from the input multi-tone signal at each peak of the input signal that exceeds a predetermined threshold. Thus, one or several peaks may be clipped in this fashion and in a single iteration. However, reducing one or more peaks may cause the resulting waveform to exceed the clipping threshold at other positions. Therefore, the tone reservation process is typically repeated until a satisfactory peak-to-average reduction is achieved. The impulse functions created from the subset of reserved frequencies are usually pre-computed since the subset of reserved frequencies is usually known in advance. From the foregoing, it will be appreciated that the digital reduction of the peak to average power ratio of a complex radio signal while filtering the signal to remove out of band emissions provides a way to reduce the peak demand on a power amplifier, thereby enabling improved efficiency and cost of a radio system with a small but acceptable degradation in signal quality.

Single-carrier GSM has a low PAPR however when multiple GSM carriers are combined together then this becomes a complex radio signal. Moreover, the carrier frequencies in multi-carrier GSM systems hop to different frequencies as a function of time and have stringent emissions requirements between carrier signals. This means that the standard techniques used to reduce the PAPR which were described above for, e.g., CDMA, WCDMA and LTE systems will not work properly when applied to, for example, multi-carrier GSM systems. As a result multi-carrier power amplifiers capable of handling multi-carrier GSM signals typically have a significant reduction in total output power capability as the number of carriers increase due to the increase in PAPR.

SUMMARY

Peak power reduction in transmit chains of frequency hopping, multi-band radiocommunication devices is performed using various techniques. An error signal is generated which accounts for the frequency hopping of each of a number of baseband signals, and is used to iteratively reduce peak power in each of the baseband signals prior to combining them into a multi-band signal.

According to one exemplary embodiment, a method for reducing peak power of a signal in a multi-band, frequency hopping radiocommunication system includes the steps of receiving a plurality of baseband signals each of which are associated with a different frequency band, receiving frequency hopping information associated with each of the plurality of baseband signals, adjusting a frequency of each of the baseband signals using respective frequency hopping information to generate a plurality of frequency hopping adjusted baseband signals, combining the plurality of frequency hopping adjusted baseband signals into a single, multi-band signal, clipping the single, multi-band signal to generate an error signal, providing the error signal to a plurality of paths, each associated with one of the plurality of baseband signals, adjusting a frequency of the error signal on each of the plurality of paths based on the respective frequency hopping information to shift the error signal on each of the plurality of paths back to a respective baseband frequency, and subtracting each of the frequency adjusted error signals from a respective one of the plurality of baseband signals to generate a plurality of peak power compensated baseband signals.

According to another exemplary embodiment, a transmitter configured to reduce peak power of a multi-carrier signal includes a first plurality of tuners configured to receive a plurality of baseband signals each of which are associated with a different frequency band and frequency information associated with each of the plurality of baseband signals and further configured to adjust a frequency of each of the baseband signals using respective frequency information to generate a plurality of frequency adjusted baseband signals; a first combiner configure to combine the plurality of frequency adjusted baseband signals into a single, multi-band signal; a clipping unit configured to clip the single, multi-band signal to generate an error signal and to provide the error signal to a plurality of paths, each associated with one of the plurality of baseband signals; a second plurality of tuners configured to adjust a frequency of the error signal on each of the plurality of paths based on the respective frequency information to shift the error signal on each of the plurality of paths back to a respective baseband frequency; and a plurality of subtractors configured to subtract each of the frequency adjusted error signals from a respective one of the plurality of baseband signals to generate a plurality of peak power compensated baseband signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Exemplary embodiments address peak power reduction in multi-carrier, frequency hopping systems (e.g., GSM) by performing multiple clip, filter and subtract passes on the combined signal to reduce the peak to average of the signal while minimizing the impact to signal quality or error vector magnitude (EVM). The carriers are typically frequency hopping, so exemplary embodiments employ a digital tuner or CORDIC (COordinate Rotation DIgital Computer) to shift the frequency of the individual carriers and to shift the error signal back so that fixed frequency baseband filters can be used on the error signal. The filters are scaled in gain according to exemplary embodiments based upon the frequency pattern of the carriers.

Figure 1:
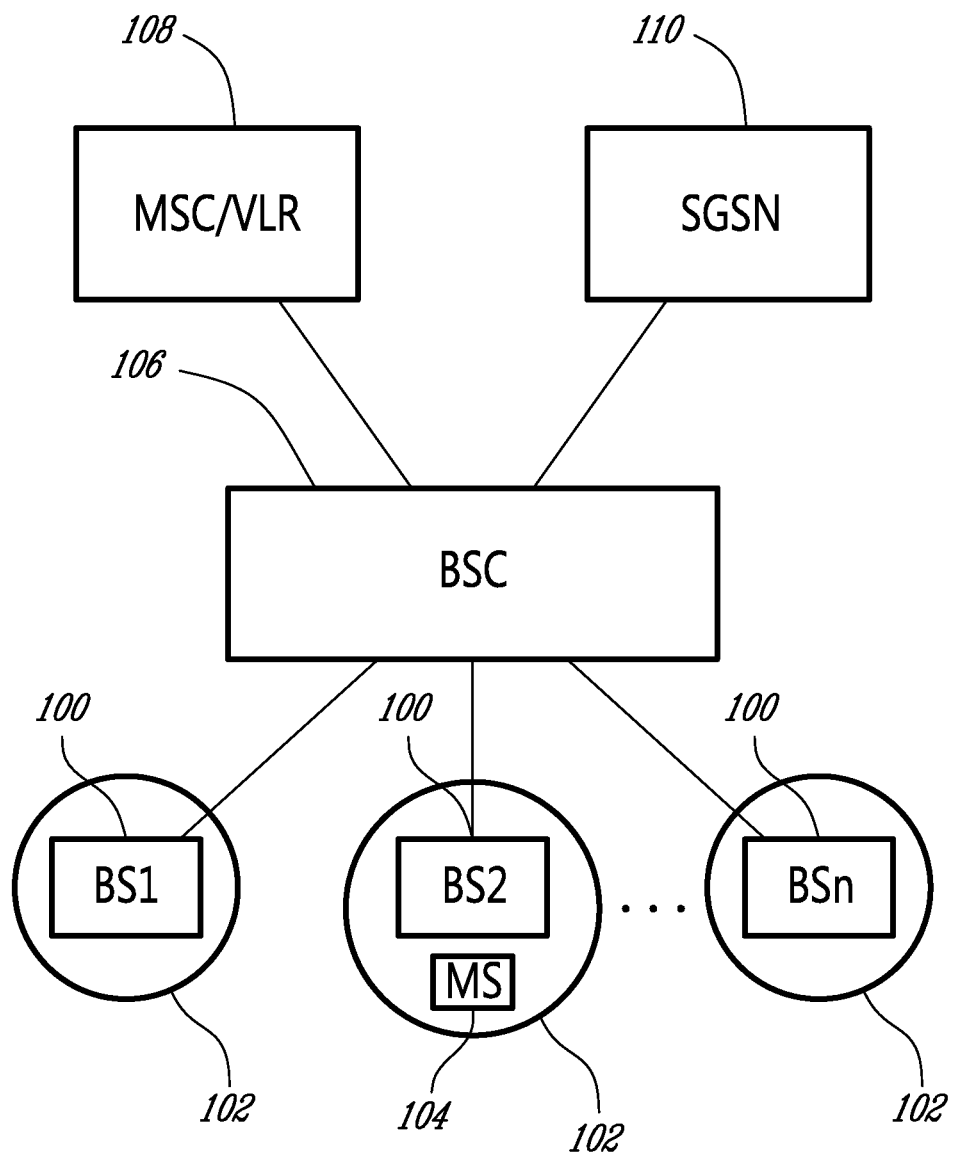
FIG. 1 illustrates an exemplary GSM access network in which exemplary embodiments can be implemented.
Figure 2:
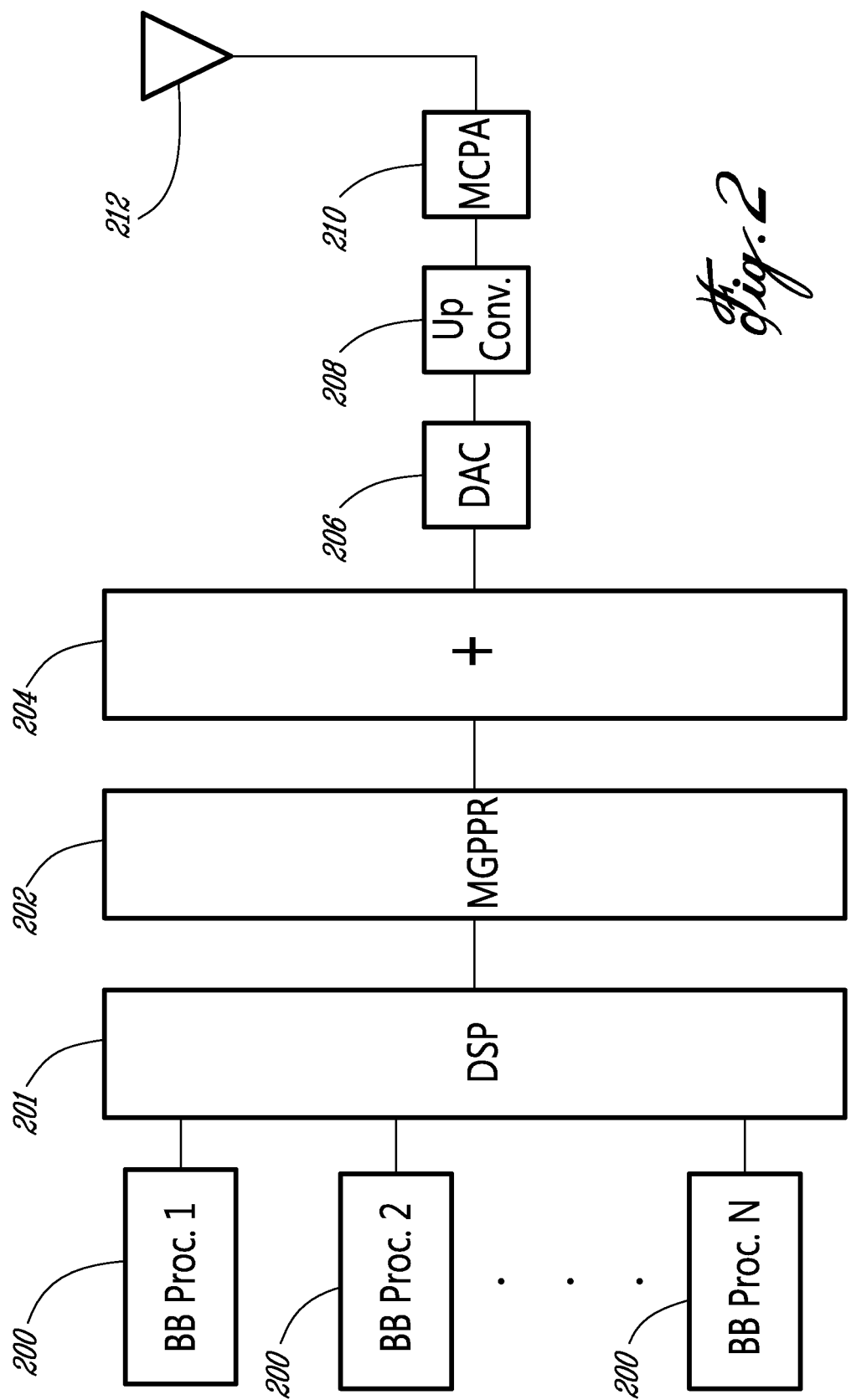
FIG. 2 depicts exemplary signal processing associated with a base station in which exemplary embodiments can be implemented.

To provide some context for a more detailed discussion of peak power reduction in GSM multi-carrier systems according to exemplary embodiments, consider first the exemplary GSM radiocommunication system illustrated in FIGS. 1-2. Although the following embodiments are described in the context of a GSM radiocommunication system, it will be appreciated by those skilled in the art that the peak power reduction techniques described herein can also be applied to other systems including, but not limited to, Wideband Code Division Multiple Access (WCDMA), CDMA, GSM, UTRA, E-UTRA, High Speed Packet Access (HSPA), UMB, WiMaX and other, systems, devices and methods.

In the context of the air interface, each base station 100 (also sometimes referred to in GSM terminology as a "base transceiver station") is responsible for transmitting signals toward, and receiving signals from, one or more cells 102 over an air interface which is defined by the GSM standard, the Enhanced Data rates for GSM Evolution (EDGE) standard and/or the General Packet Radio (GPRS) standard. Each cell 102 provides radio signal coverage to any mobile station (MS) 104 which is operating within that cell. Each base station 100 is also connected to a base station controller (BSC) 106 which handles various tasks including, for example, handovers between base stations 100 which occur when a mobile station 104 moves from one cell 102 to another cell 102. The BSC 106 is further connected to, in this exemplary system, a mobile switching center (MSC)/visited location register (VLR) 108, which operates to manage circuit-switched voice calls in the system, and a serving GPRS support node (SGSN) 110 which operates to manage packet-switched calls in the system.

FIG. 2 illustrates some of the basic functional blocks of an exemplary multi-carrier transmitter 180 which can be used in a base station 100. Each of the frequency bands handled by the multi-carrier transmitter 180 has a baseband processor 200 associated therewith which generates a baseband signal containing information to be transmitted over a respective frequency band. Each baseband signal is processed according to embodiments described below to reduce the peak power of the combined signal in Multi-carrier GSM Peak Power Reduction (MGPPR) unit 202 prior to being combined in combiner 204 to generate a multi-carrier signal. The MGPPR unit 202 can, for example, be preceded by one or more digital signal processing (DSP) functions 201 such as an interface block handling communication to local or remote baseband processing, a beamforming function, an antenna calibration function and/or a gain control function. Downstream of the MGPPR function 202, the combiner 204 can also include or perform other DSP functions such as a digital pre-distortion function, a DC feedthrough function, an I/Q compensation function, a DAC roll-off compensation function, a gain control function, and/or an equalization function.

Regardless of which other DSP functions precede or follow MGPPR function 202, the combined, multi-carrier signal output from combiner 204 is then converted to an analog signal at digital-to-analog converter (DAC) 206, upconverted from baseband to RF in block 206 and amplified by the multi-carrier power amplifier (MCPA) 210, prior to being transmitted via antenna 212. It will be apparent to those skilled in the art that the transmit chains illustrated in FIG. 2 could contain additional elements or be configured in different ways. For example, the base station transmitter 180 could include multiple antennas to which the multi-band signals are distributed for transmission.

Figure 3:
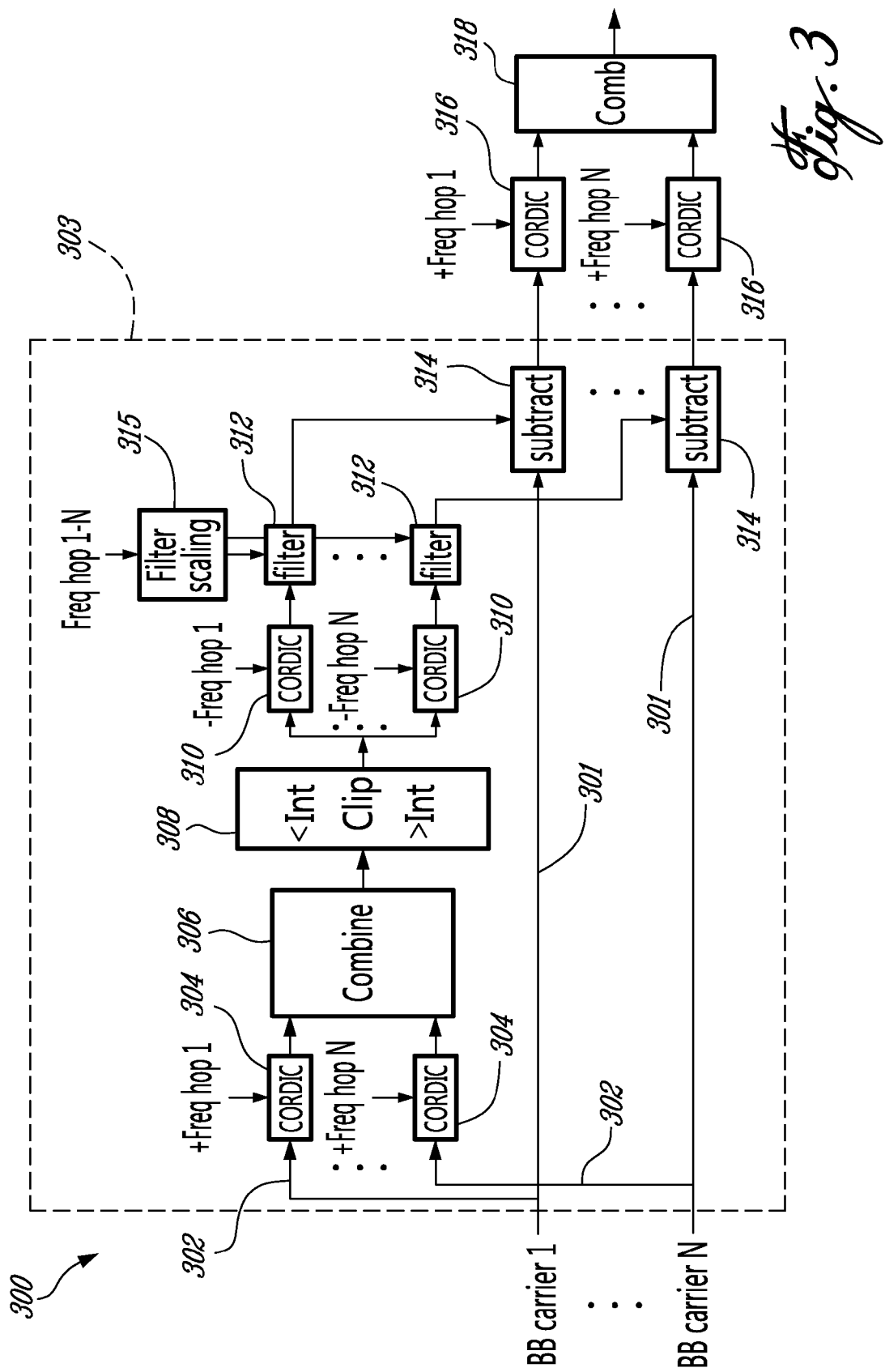
FIG. 3 shows a peak power reduction circuit using interpolation according to an exemplary embodiment.

An exemplary MGPPR function or apparatus 300 according to an embodiment using interpolation is shown in FIG. 3. Therein, the apparatus 300 receives as inputs multiple GSM baseband (BB) carriers 1 ... N and frequency hopping information for each carrier (or a static list of frequencies if hopping is not used). Note that herein the phrase "frequency information" is used to generically refer to frequency hopping information, a static list of frequencies if frequency hopping is not used, or other types of frequency related information which can be used in MGPPR functions according to these embodiments. It will also be appreciated by those skilled in the art that while only two branches are shown in FIG. 3, i.e., corresponding to the first and Nth baseband signal, that the apparatus 300 will typically have one branch per carrier.

Each baseband signal is provided to a main path 301 and an error path 302, which performs an iterative process within dotted line block 303 for k iterations. CORDIC tuners 304 in the error path 302 shift the frequency of each of the GSM baseband carriers to corresponding frequencies to compensate for the frequency hopping (if any) based on the input frequency hopping information. The starting phase of the CORDIC tuner 304 for each carrier is either randomized or selected in a random order from a set of phases evenly spread over 360 degrees in order to prevent systematic signals from adding constructively in the combiner 306. The starting phase of the CORDIC tuners 310 and 316 are coordinated with the starting phases selected for the corresponding CORDIC tuner 304. The signals are then combined in combiner 306 at a sample rate which is sufficient to retain all of the signal information.

Continuing in the error path, the combined signal is interpolated at block 308 to an appropriate sample phase depending upon the iteration number, clipped to produce the error signal and then interpolated back to the original sample phase. Some more detailed examples of various implementations of the interpolating/clipping unit 308 are provided below with respect to FIGS. 5 and 6. CORDIC tuners 310 then shift the frequency of the error signal back to baseband for each of the GSM baseband carriers according to the frequency hopping information, i.e., to reverse the process performed by CORIC tuners 304. The baseband error signals for each of the GSM carriers are then filtered in filters 312 and subtracted in subtractors 314 from the original baseband GSM carriers from the main path 301. This process within block 303 is repeated for K iterations, such that the output of subtractors 314 becomes the input to the apparatus 300, where K is selected such that the number of interpolated phases is sufficient to ensure that the peaks of the signal are sufficiently processed to provide the desired peak power reduction once the signal is converted into an the analog signal that the power amplifier must handle. The value for K can be determined, for example, based on a cost/power versus diminishing return performance gain trade-off which will depend on the technology being used to implement the design. Some purely illustrative values for K can include 3-7 inclusive, and specifically 4 and 6, however embodiments of the present invention are not limited to these specific values.

The filters 312 can optionally have a scaling factor gs applied to them via filter scaling block 315. This scaling factor, if used, enables system 300 to improve its performance, particularly for systems implementing relatively few iterations K, by enabling more aggressive clipping of peaks. This scaling function can, for example, be used with multi-carrier CDMA, or WCDMA or LTE or combinations of these air interface technologies when there are gaps between the carriers even without any frequency hopping. According to an embodiment, the scaling factor gs can be computed in filter scaling block 315 from the frequency hop or carrier frequencies as follows:

$$gs = \frac{\sigma(N + M)}{\sum_{i=1}^{N} g_i} \quad (1)$$

where N is a number of the different frequency bands, M is a number of unoccupied carriers between the different frequency bands, and $g_i$ is a pass-band voltage gain of an error filter which performs the clipping for the $i^{th}$ one of the different frequency bands associated with a scaling factor of 1. In the general case $g_i$ may be different for each carrier to account for the relative power levels for each carrier and any other weighting factors. The additional factor σ (sigma) in the above equation is a performance optimization parameter. Sigma can, for example, have a value of about 0.5 with an exemplary implementation using K=4 iterations.

After K iterations of performing the above-described clip, filter and subtraction operations in block 303, the resulting baseband GSM carriers are frequency shifted by CORDIC units 316 (or the like). The outputs of CORDIC units 316 are combined in combiner 318 to produce a GSM multi-carrier signal with peak power reduction according to this embodiment.

Figure 4:
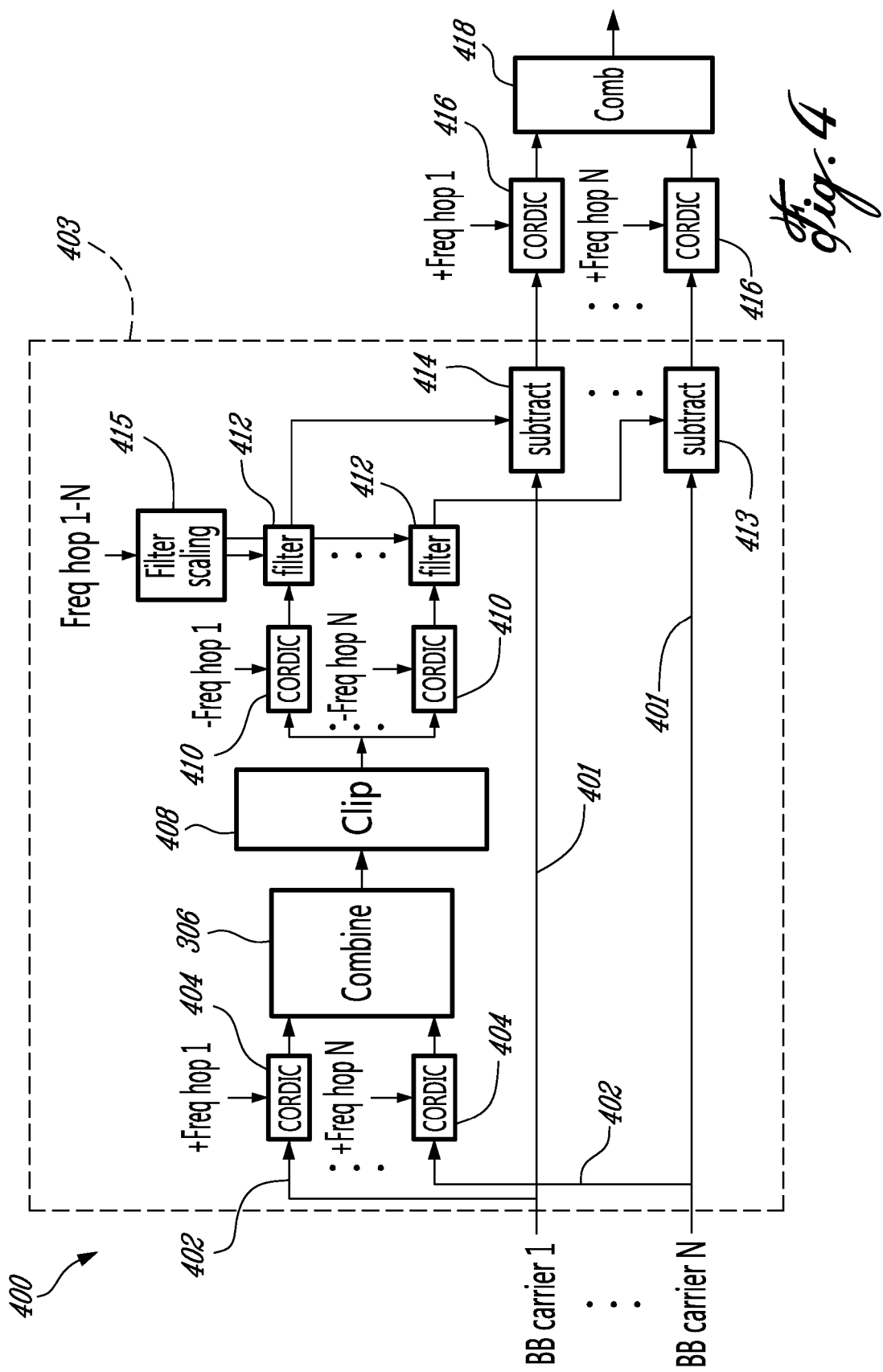
FIG. 4 shows a peak power reduction circuit using upsampling according to another exemplary embodiment.

An MGPPR apparatus 400 according to another embodiment which uses up-sampling instead of interpolation is shown in the block diagram of FIG. 4. Therein, the apparatus 400 receives as inputs multiple GSM baseband carriers 1 . . . N and frequency hopping information for each carrier (or a static list of frequencies if hopping is not used). It will be appreciated by those skilled in the art that while only two branches are shown, corresponding to the first and Nth baseband signal, that the apparatus 400 will have one branch per carrier.

Each baseband signal is provided to a main path 401 and an error path 402, which performs an iterative process within dotted line block 403 for k iterations. CORDIC tuners 404 in the error path 402 shift the frequency of each of the GSM baseband carriers to corresponding frequencies to compensate for the frequency hopping (if any) based on the input frequency hopping information. The starting phase of the CORDIC tuner 404 for each carrier is either randomized or selected in a random order from a set of phases evenly spread over 360 degrees in order to prevent systematic signals from adding constructively in the combiner 406. The starting phase of the CORDIC tuners 410 and 416 are coordinated with the starting phases selected for the corresponding CORDIC tuner 404. The signals are then combined in combiner 406 at a sample rate which is sufficient to retain all of the signal information and to ensure that the peaks of the signal are sufficiently processed to provide the desired peak power reduction once the signal is converted into the analog signal that is amplified by the power amplifier. The sampling rate of the signal input to block 403 should, for example, be about 4 times that of the Nyquist sampling rate that is determined from the maximum bandwidth that the combined signal occupies, e.g., if the maximum signal bandwidth is 10 MHz, the Nyquist sample rate would be 10 Msps for each of I and Q so the upsampled signal would be 4 times that at 40 Msps.

Continuing in the error path, the combined signal is clipped in clip unit 408 to produce the error signal without interpolation in this embodiment. CORDIC tuners 410 then shift the frequency of the error signal back to baseband for each of the GSM baseband carriers according to the frequency hopping information, i.e., to reverse the process performed by CORDIC tuners 404. The baseband error signals for each of the GSM carriers are then filtered in filters 412 and subtracted in subtractors 414 from the original baseband GSM carriers from the main path 401. This process within block 403 is repeated for K iterations, such that the output of subtractors 414 becomes the input to the apparatus 400, where K is selected such that the number of upsampled phases is sufficient to ensure that the peaks of the signal are sufficiently processed to provide the desired peak power reduction once the signal is converted into an the analog signal that the power amplifier handles and may have similar values to those described above with respect to the embodiment of FIG. 3. The filters 412 can have a scaling factor gs applied to them via a filter scaling function 415. According to an embodiment, the scaling factor gs can be computed using the same equation (1) given above for the embodiment of FIG. 3.

After K iterations of performing the above-described clip, filter and subtraction operations in block 403, the resulting baseband GSM carriers are again frequency shifted by CORDIC units 416 (or the like). The outputs of CORDIC units 416 are combined in combiner 418 to produce a GSM multi-carrier signal with peak power reduction according to this embodiment.

Figure 5:
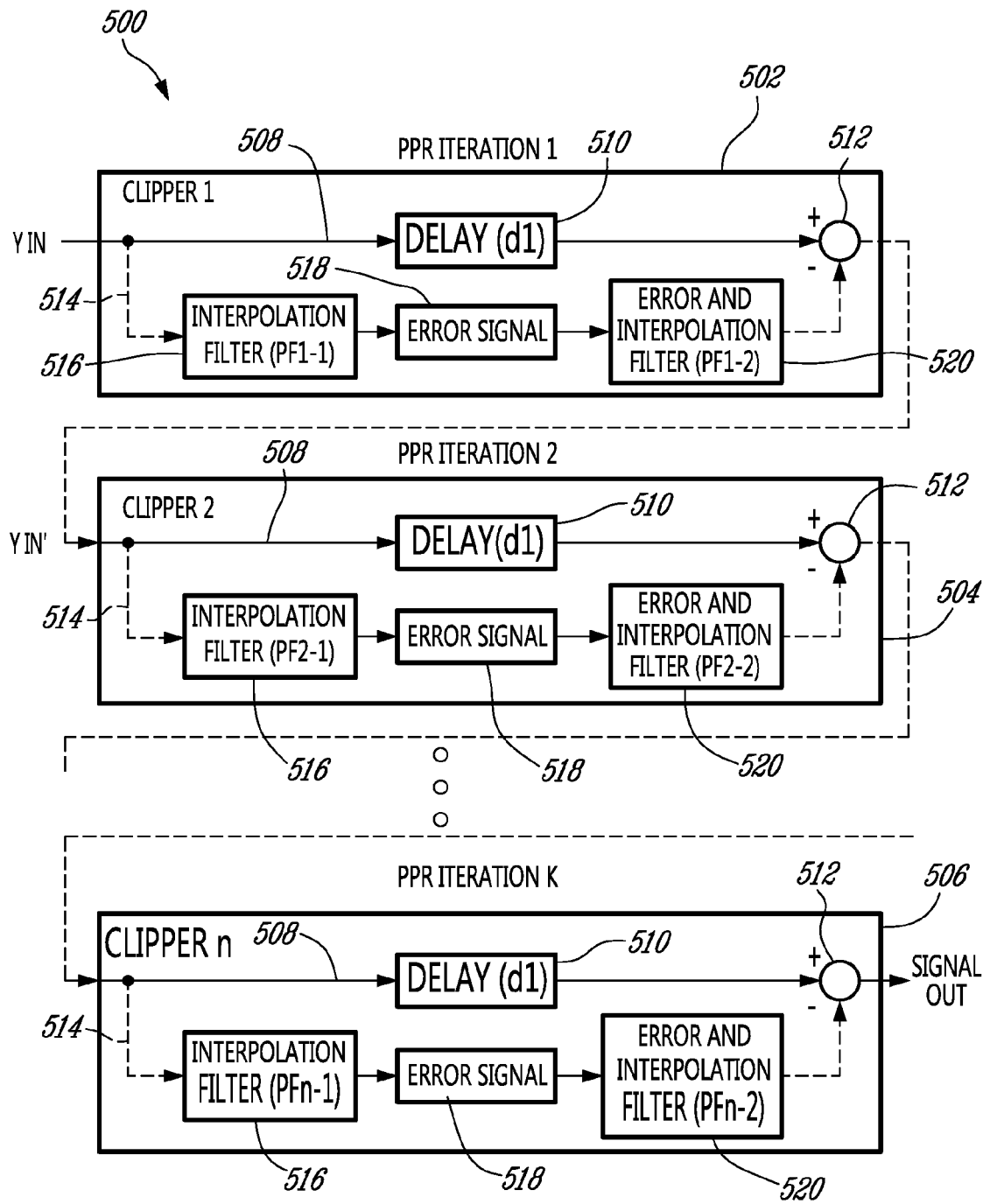
FIG. 5 illustrates a unit for performing interpolating and clipping to generate an error signal according to an embodiment.

The iterative interpolating, clipping, and interpolating process associated with the embodiment of FIG. 3 and described above can be implemented in various ways. One example is illustrated in FIG. 5. Therein, the details associated with the multi-band aspects of the apparatus which are discussed above are omitted in FIG. 5 in order to focus instead on the details associated with one exemplary interpolating/clipping unit 500 (which can operate as unit 308 in FIG. 3), which receives as an input $Y_{IN}$ the combined multi-band signal. As compared with the upsampling embodiment of FIG. 4, the interpolation embodiment of FIGS. 3 and 5 enables the MGPPR unit 202 to operate at lower sample rates, e.g., between one to two times the Nyquist rate, while maintaining similar performance to the higher sample rate PPR with lower implementation size, cost and power consumption. As shown, this exemplary interpolating/clipping unit 308 performs multiple (K) clip and filter passes on the signal. Each pass operates on a different time shift of the signal, and optionally a fractional interpolated time shift, to make apparent peaks which would otherwise appear between samples at the low sample rate.

In general, multiple passes are employed for PPR according to this embodiment to handle regrowth of the larger peaks that are above the clipping threshold for multiple samples. For the multiple sample peaks it may not matter whether the signal has an interpolated time shift or not. However for peaks with short duration (sharp peaks) a single pass is more effective at reducing the peak, but the peak can be missed if it occurs between samples at a low sample rate. Operating on a different (interpolated) fractional time shift of the signal for each pass maintains the multipass benefit for longer peaks, while providing visibility to between sample peaks that would otherwise only be possible by upsampling or increasing the sample rate of the signal.

The combined, multi-band signal $Y_{IN}$, having a sample rate which can, for example, be close to the Nyquist rate (e.g., between one and two times the Nyquist frequency for this signal) is input to a first stage 502 from an upstream transmit chain component (not shown in FIG. 5). Initially, it will be appreciated that each stage 502, 504 . . . 506 has two signal paths: a primary signal path (upper path in each stage), and an error signal path (lower signal path in each stage). For example, in stage 502, the received signal $Y_{IN}$ follows the primary signal path into a delay element 510 prior to reaching summer (subtractor) 512 where $Y_{IN}$ is subtracted from an output of the error signal path 514. The delay element 510 delays the input signal $Y_{IN}$ so that it is time-aligned with the output of the error signal path 514 in summer 512.

As can be seen in FIG. 5, most of the signal processing associated with PPR according to this exemplary embodiment takes place in the error signal path 514. In the error signal path, the input signal $Y_{IN}$ is first processed by an interpolation filter 516 which, generally, performs a sub-sample, interpolated time-shifting on the input signal and may also, according to some exemplary embodiments, interpolate the signal to a higher rate than the input rate, e.g., between 1 and 2 times the Nyquist rate of the input signal $Y_{IN}$. As discussed below, for each stage in the interpolation/clipping unit 508, the amount of time-shifting which is applied by interpolation filter 516 will typically vary. For example, in the first stage 502, the amount of time-shifting will typically be zero (since the sample has not yet been processed), while in the second and subsequent stages 504, 506, etc., a different amount of time-shifting will be applied by filter 516, e.g., 0.5 of a sample period, 0.25 of a sample period, etc.

Once the input signal $Y_{IN}$ has been sub-sample time shifted by filter 508, it passes to block 518 wherein an error signal associated with the sub-sample, time-shifted version of $Y_{IN}$ is calculated. In this context, the error signal e1(n) represents the portion of the input signal which exceeds a predetermined peak power threshold and can be calculated by function 518 as shown below.

$$e1(n) = \left[1 - \frac{\sqrt{T_{PPR}(i)}}{|y_{in}(n)|}\right] y_{in}(n) \qquad (2)$$

where $T_{PPR}$ is a peak power reduction threshold value. This error signal $e1(n)$ can be re-written as:

$$e1(n) = f(u) y_{in}(n) \qquad (3)$$

where:

$$f(u) = \begin{cases} 0; & u \leq 1 \\ 1 - \frac{1}{\sqrt{u}}; & u > 1 \end{cases}$$

and $$u(n) = \frac{|y_{in}(n)|^2}{T_{ppr}(i)} = \frac{1}{T_{ppr}(i)} |y_{in}(n)|^2 = T_F(i)|y_{in}(n)|^2$$

The error signal is then processed by an error and interpolation filter 520. The error and interpolation filter 520 implements a complimentary (relative to filter 516) inverse time-shift to align the input and error signals for summing at summer 512, as well filtering the error signal to reject out-of-band noise energy. If the filter 516 interpolates the input signal, then a corresponding decimation to the sample rate of the input signal is performed by error and interpolation filter 520 prior to generating its filtered output for summing. By placing the filtering and interpolation functions 516 and 520 which are performed by the interpolating/clipping unit 500 in the error signal path of each stage, exemplary embodiments enable the error and interpolation filters, e.g., filter 520 in stage 502, to be less complicated, e.g., by having fewer taps.

By subtracting the filtered error signal with the delayed input signal at summer 512, excess signal energy associated with a peak at a given time instant (if a peak exists at that time instant) is clipped. The clipped input signal is then input to another stage 504 in the interpolating/clipping unit 500, wherein it undergoes the same processing as described above, albeit with the same or with a different sub-sample, time shift. This process continues for as many stages as are present, with each successive stage operating on the input signal at a different sub-sample time instant (or, for some stages, possibly the same sub-sample time instant) until a final output is generated and passed to the next downstream element in the transmit chain. Thus the same reference numerals are used for the elements of stages 504 and 506 in FIG. 5 to identify the same or similar functions/components, albeit the operation of interpolation filters 516 and error and interpolation filters 520 will vary from stage to stage as described briefly above, and in more detail below. The number of stages or iterations K can be selected as a tradeoff between peak power reduction performance and processing cost/complexity.

According to one exemplary embodiment, the interpolating/clipping filter 300 can operate on the input signal at a sampling rate which is close to the Nyquist rate, e.g., between 1 and 2 times Nyquist, in which case filters 516 and 520 are fractional/sub-sample delay filters which perform complementary sub-sample time-shifts of the input signal without interpolating the signal. The sub-sample time shift intervals can be regularly spaced by 1/N, where if filter 516 implements a time-shift of (k−1)/N samples then the filter 520 performs a time shift of 1−(k−1)/N, 1=<k<=N. According to other exemplary embodiments, the filter 516 may also perform interpolation to increase the sample rate to, e.g., between 1-2 times the Nyquist rate, with filter 520 then performing a complementary decimation of the error signal. Additionally, it should be noted that the threshold $T_{PPR}$ can be the same for each stage of processing, may differ for each stage of processing, or some combination thereof.

Figure 6:
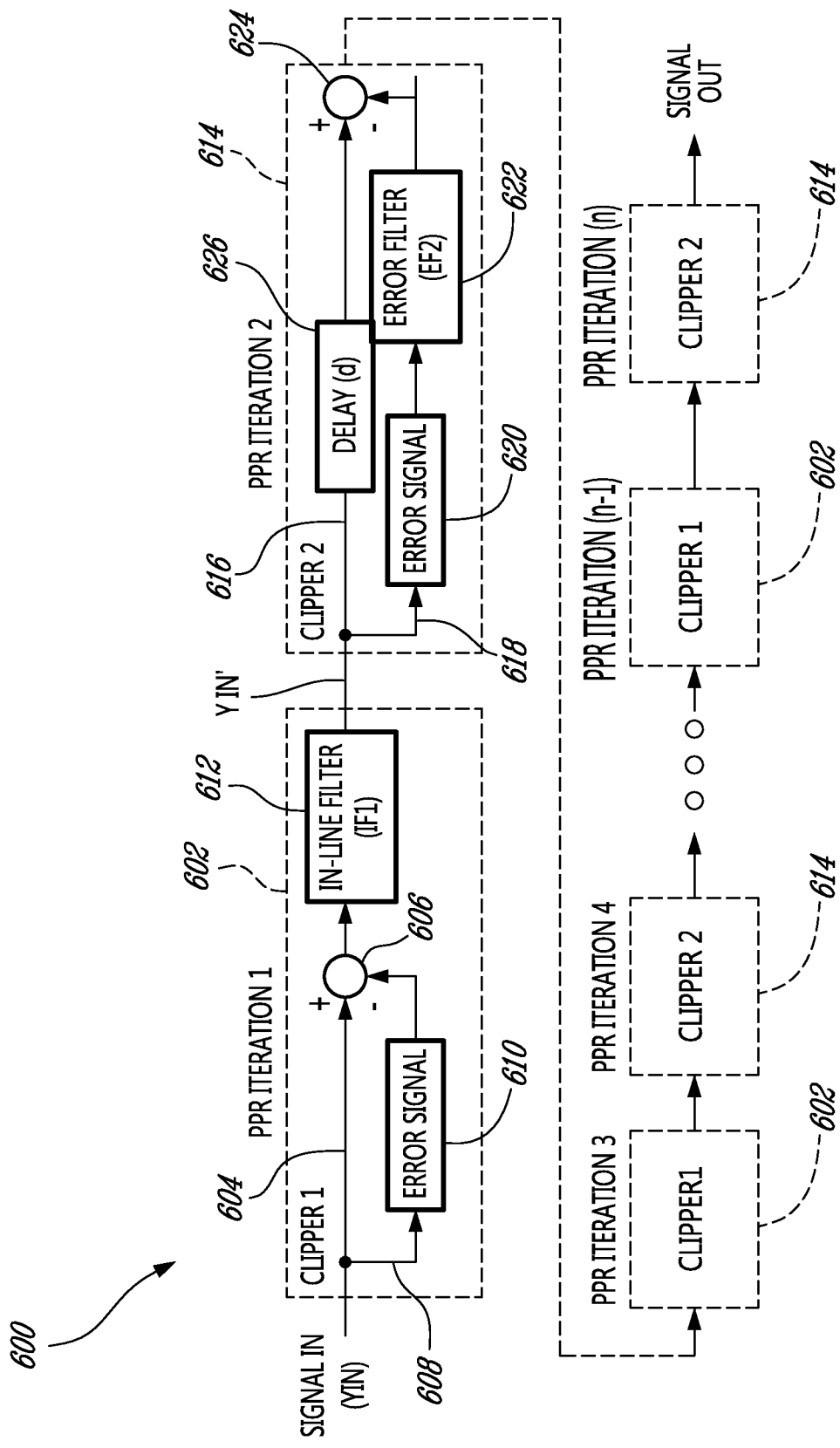
FIG. 6 shows a unit for in-line filtering to generate an error signal according to another embodiment.

Another embodiment of a peak power reduction circuit 600 (which can be used as unit 308 in FIG. 3) is shown in FIG. 6. In this exemplary embodiment, filtering is performed in the primary signal path (in-line), as opposed to in the error signal path as described in the previous exemplary embodiment of FIG. 5, to handle the case where the input signal itself requires filtering to meet out-of-band emission requirements. Therein, in stage 602, an input signal $Y_{IN}$ is passed along a primary signal path 604 to a summer 606, and also along an error signal path 608. In the error signal path 608, the input signal is used to calculate and generate an error signal by error signal generation function 610 in the manner described above with respect to equations (2) and (3). This error signal is then presented to the summer 406, where it is added to the input signal $Y_{IN}$ to generate a clipped input signal.

The clipped input signal is then filtered by in-line filter 612 so that the clipped input signal meets out-of-band emission requirements associated with the particular type of transmitter (and radiocommunication standard) in which apparatus 600 is deployed. The in-line filter 612 also performs a sub-sample time shifting of the clipped input signal so that the next stage 614 operates on a different sample phase than the first stage 602. As with the previous exemplary embodiment of FIG. 4, the apparatus 600 may operate at close to the Nyquist rate of the input signal. Alternatively, the in-line filter 612 may also perform a low fractional rate interpolation to generate additional signal samples, e.g., to raise the effective sample rate of the signal up to a higher sample rate between one times and twice the Nyquist rate, where the filter does not increase the actual sample rate but acts as if a low rate interpolation and decimation are performed. More specifically, the in-line filter 612 efficiently generates values between the original sample points of the input signal, which can be described mathematically as data interpolation over an axis with arbitrarily fine resolution where the size of the interpolated data is one to two times bigger than the source. The in-line filters 612 can, for example, be implemented using a variety of filters which range from a low pass filter operating on each of the I and Q signals for a symmetrical, single pass band scenario to multiple pass bands, asymmetric complex filters, depending on the system configuration of interest.

The filtered and clipped output of in-line filter 612 (also referred to in FIG. 6 as $Y_{IN}'$) is passed on to the next stage 614 for additional processing. This stage 614 also includes a primary signal path 616 and an error signal path 618. An error signal is computed, by function 620, based on the input signal $Y_{IN}'$ and using, for example, equations (2) and (3) discussed above. The error signal is then filtered by error filter 622, which can have an odd number of taps and operates to minimize the out-of-band signal energy which appears after the clipping process of 620. The filtered error signal is then subtracted at summer 624 with the input signal $Y_{IN}'$, which has been delayed by delay element 626 to provide time alignment at the summer 624, thus clipping any peak which is found at the sample phase established by in-line filter 612.

The output of stage 614 of unit 600 may then be input to one or more additional pairs of stages 602, 614 as shown in FIG. 6, with the number of pairs of stages n being determined as a tradeoff between accuracy, complexity and cost. These downstream pairs of stages 602, 614 will be the same or similar to the initial pair of stages 602, 614 albeit the sub-sample phase difference (and possibly the interpolated sample points) associated with each pair of stages will differ.

Figure 7:
FIG. 7 depicts parameters associated with various simulations.
Figure 8:
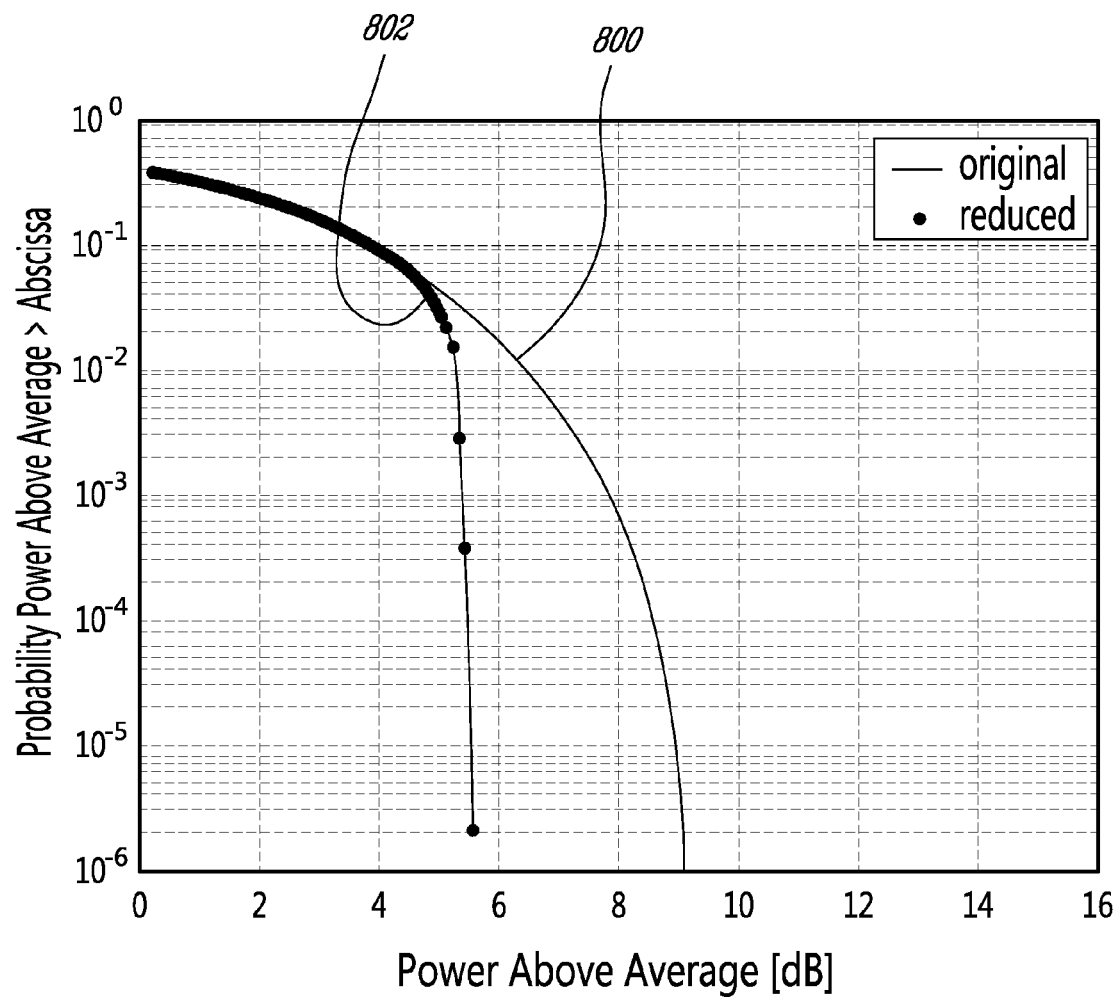
FIGS. 8-10 are graphs depicting results of one of the simulations of FIG. 7.

Some simulations have been performed which illustrate exemplary performance benefits associated with using MGPPR techniques such as those described above. It will be appreciated by those skilled in the art that these results are purely exemplary and that other implementations may achieve greater or lesser reductions in PAPR. FIG. 7 shows some exemplary parameters associated with two simulated systems using the upsampled embodiment of MGPPR (FIG. 4) with 8 GMSK frequency hopped carriers and performing 15 iterations. In the first simulation, associated with row 700, the system was permitted to have a −15 dB signal-to-noise ratio (equivalent to 18% error vector magnitude (EVM)). The peak-to-average ratio (PAR) of the signal before implementing MGPPR as described herein was 8.4 dB, and after applying MGPPR the PAR was reduced to 5.5 dB. Statistical magnitude data generated by this simulation is plotted in FIG. 8, with function 800 providing an indication of the peak-to-average ratio without MGPPR and function 802 providing an indication of the peak-to-average ratio when MGPPR is included in the transmit chain.

Figure 9:
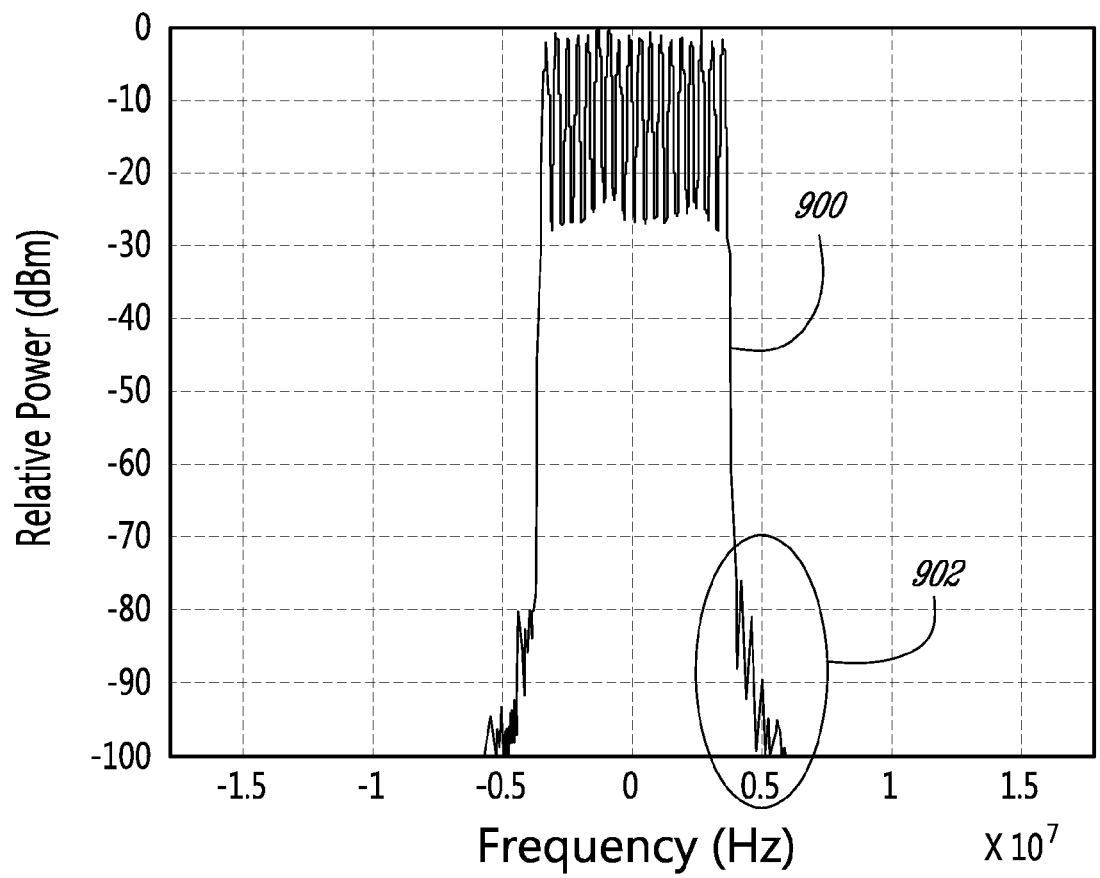
Figure 10:
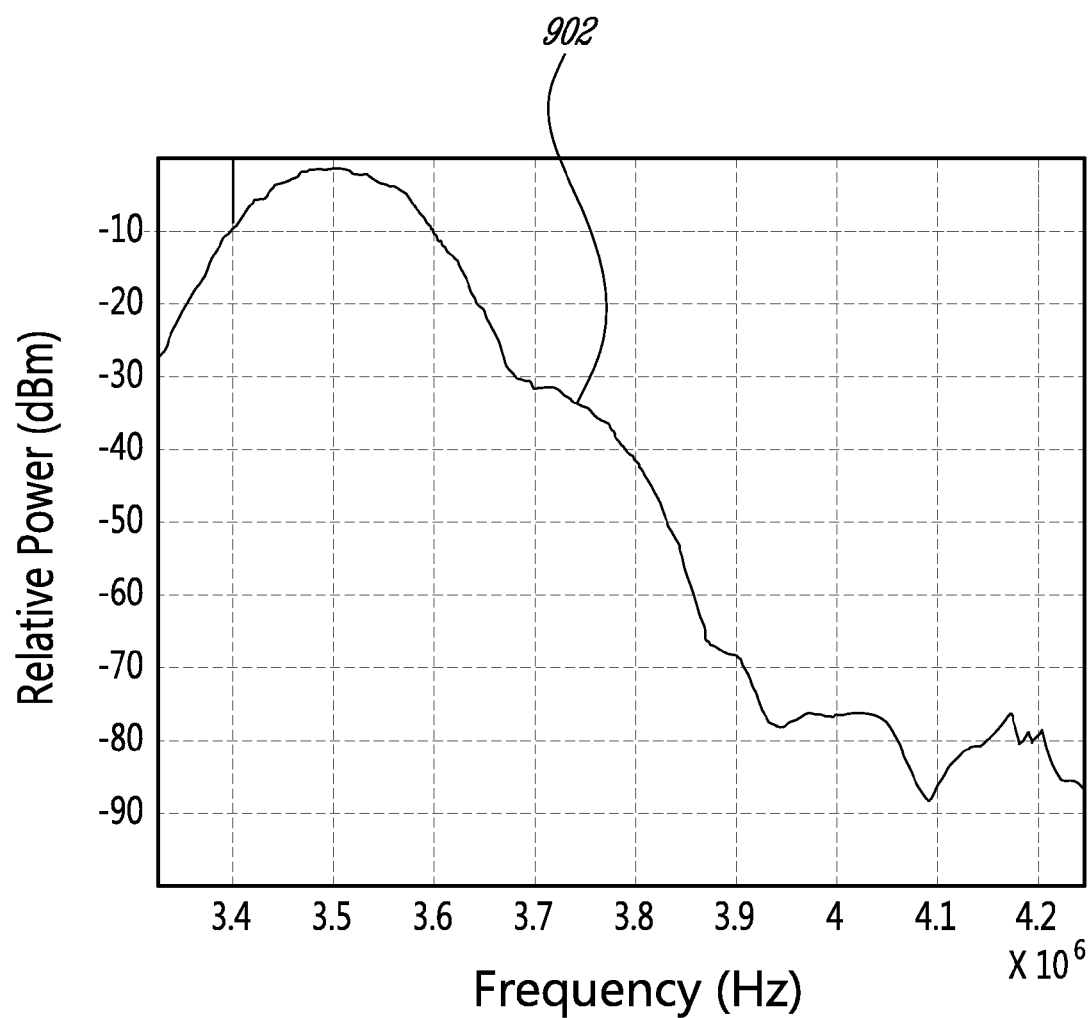

FIGS. 9 and 10 show a spectral data function 900 associated with the power emitted from the simulated system 700. The shoulder portion 902 of the function 900 is magnified in FIG. 10 to illustrate that emissions generated by a system employing MGPPR as described above would conform with the spectral mask required for out-of-band emissions in, e.g., the GSM standard. Returning to FIG. 7, another simulation was performed which simulated a radiocommunication system having a better signal quality requirement in row 702 in FIG. 7, again showing a significant reduction in PAPR.

Various modifications on the foregoing exemplary embodiments are also contemplated. For example, the inline structure of the exemplary embodiment of FIG. 6 can further be simplified to use smaller in-line filters 612 and error filters 622 in the initial passes and a larger in-line filter 612 in the second to last pass which serves as a pulse-shaping/channel filter. Alternatively, the embodiments of FIG. 5 and FIG. 6 can be combined to form a hybrid peak power reduction unit in which all of the processing passes (stages) are implemented using the error filter structure of FIG. 5, i.e., stages 502, 504, etc., except for the last two stages in the processing chain. In this hybrid embodiment, the second to last pass (stage) utilizes an in-line stage 602 with a sufficiently large filter 612 to meet shaping and spectral requirements as per the air interface standard whose specifications the transmitter is intended to meet. The last pass of the hybrid embodiment then has a stage 614 which is also designed to meet these requirements. One advantage of this hybrid embodiment is that the error filter passes can have simpler filter requirements than those associated with the embodiment illustrated in FIG. 5 due to the presence of the in-line filter at the end of the processing chain. Regardless of the number stages which are present, this hybrid embodiment presents only one inline filter to impact the signal quality for levels below the PPR threshold and this in-line filter provides the dual function of pulse-shaping the signal to be output from the MGPPR processing.

Figure 11:
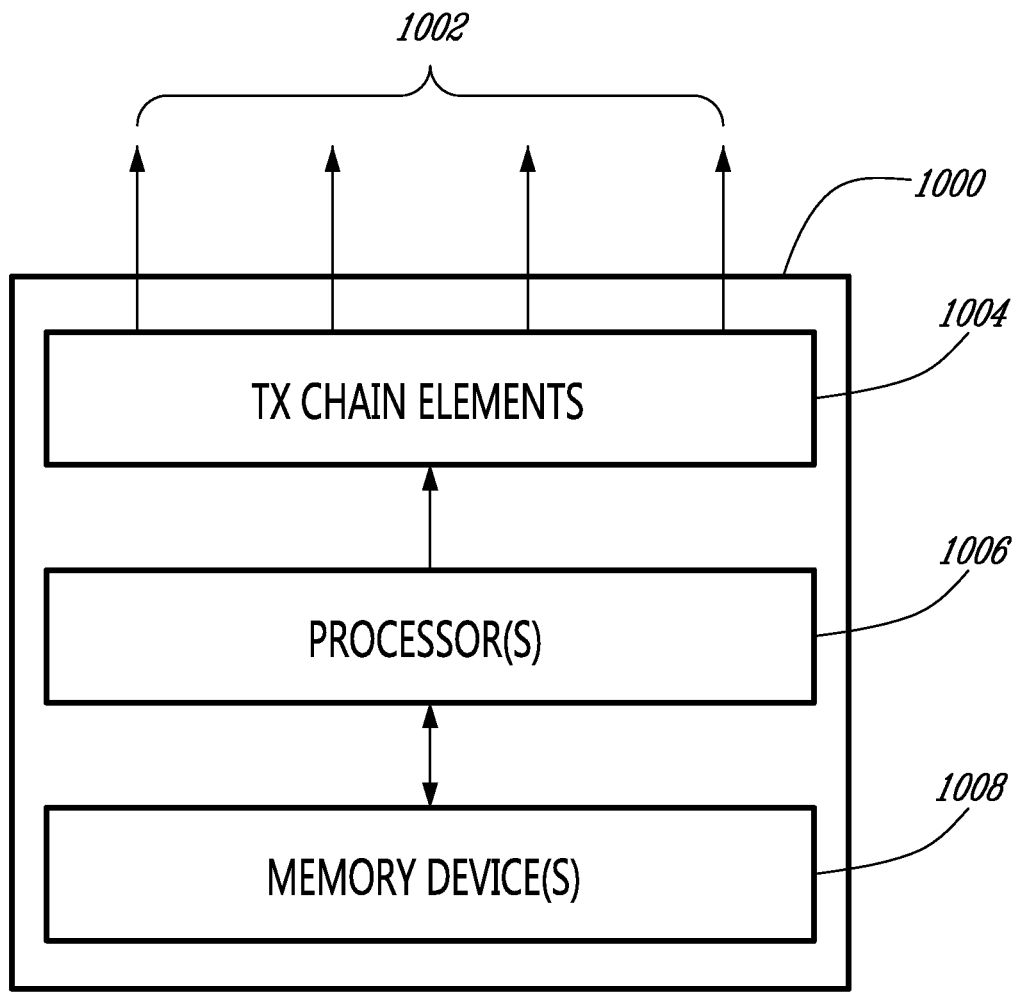
FIG. 11 shows an exemplary transmitter device in which embodiments can be implemented.

As mentioned above, the transmit processing techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The transmitter may, for example, be disposed within a radio base station, NodeB, eNodeB, or the like, to transmit information signals on a downlink radio channel. Regardless of the particular type of communication system in which these exemplary embodiments are presented, the transmit device will typically include the components illustrated generally in FIG. 11.

Therein, the transmitter 1000 includes at least one, and potentially a plurality of, physical transmit antennas 1002 (in this example numbering four, although more or fewer than four transmit antennas can be used). The physical transmit antennas 1002 are connected to a processor 1006 via transmit (TX) chain elements 1004 which can include one or more of modulators, filters, upconverters, power amplifiers and MGPPRs or variants thereof as described above, as will be appreciated by those skilled in the art. Processor(s) 1006, in conjunction with memory device(s) 1008 and TX chain elements 1004 (and potentially other devices not shown) can operate to perform the transmit processes discussed above, e.g., by way of software stored therein, additional hardware or some combination of software and hardware. Thus, it will be apparent that exemplary embodiments also relate to software, e.g., program code or instructions which are stored on a computer-readable medium and which, when read by a computer, processor or the like, perform certain steps associated with transmitting information signals.

Figure 12:
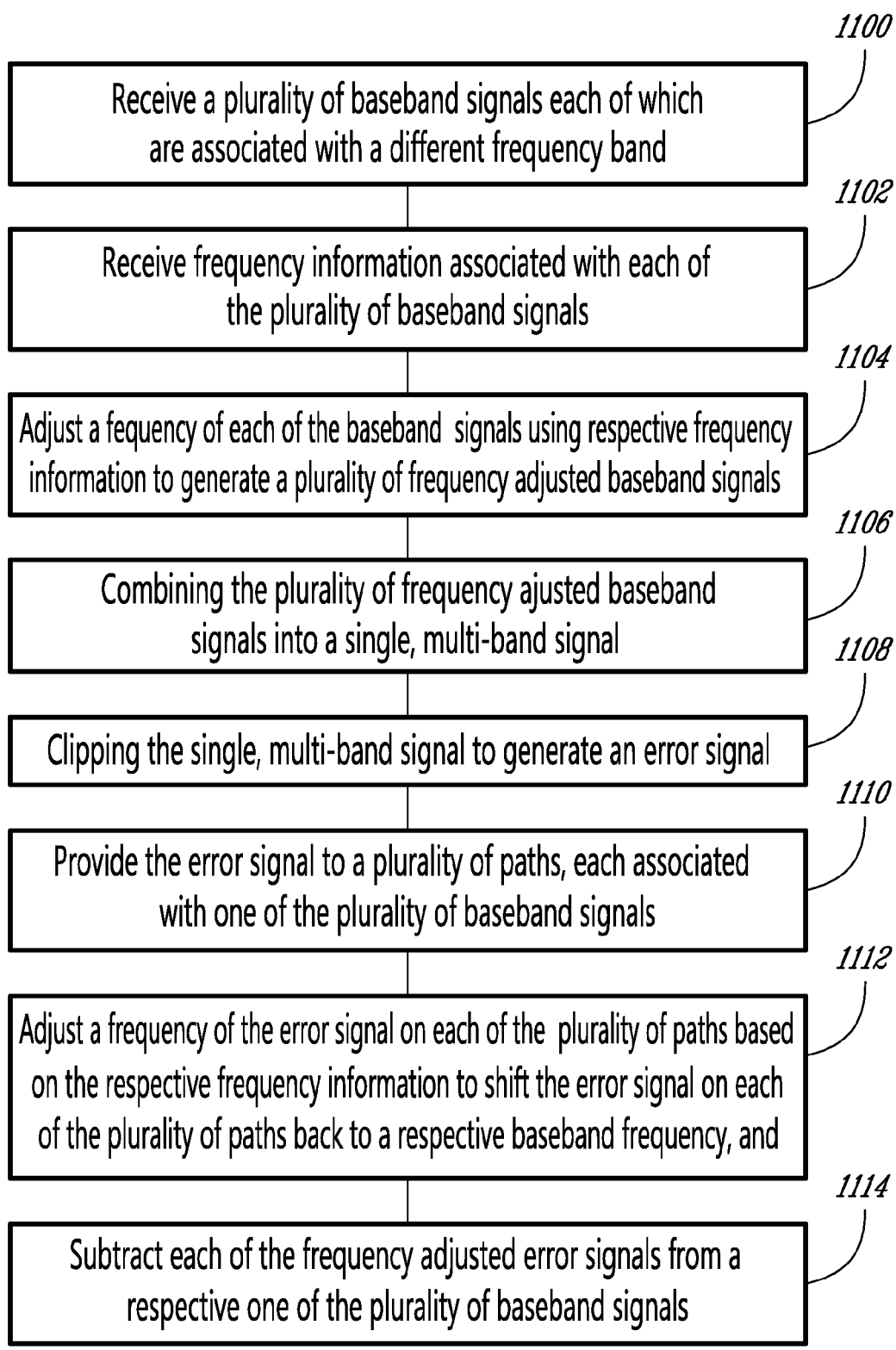
FIG. 12 is a flowchart depicting a method for peak power reduction in a multi-band, frequency hopping system.

According to another embodiment, a method for reducing peak power in a multi-band, frequency hopping radiocommunication system can include the steps set forth in FIG. 12. Therein, at step 1100, a plurality of baseband signals each of which are associated with a different frequency band are received, e.g., as inputs to an MGPPR unit. At step 1102, frequency hopping information associated with each of the plurality of baseband signals is received, e.g., as other inputs to the MGPPR unit. A frequency of each of the baseband signals is adjusted, at step 1104, using respective frequency hopping information to generate a plurality of frequency hopping adjusted baseband signals, i.e., to correspond to the signals that are actually to be transmitted later. The plurality of frequency hopping adjusted baseband signals are combined, at step 1106, into a single, multi-band signal. The single, multi-band signal is clipped to generate an error signal at step 1108, e.g., in any of the ways described in the various embodiments above. The error signal is provided to a plurality of paths, each associated with one of the plurality of baseband signals at step 1110, and then each of those error signals has their frequency adjusted at step 1112 based on the respective frequency hopping information to shift the error signal on each of the plurality of paths back to a respective baseband frequency. Each of the frequency adjusted error signals are then subtracted from a respective one of the plurality of baseband signals at step 1114.

The foregoing description of exemplary embodiments provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:
1. A method for reducing peak power of a signal in a multi-band radiocommunication system, comprising:
receiving a plurality of baseband signals:
obtaining frequency information associated with each of said plurality of baseband signals;

adjusting a frequency of each of the baseband signals using respective frequency information to generate a plurality of frequency adjusted baseband signals;

combining the plurality of frequency adjusted baseband signals into a single, multi-band signal;

clipping the single, multi-band signal to generate an error signal;

providing the error signal to a plurality of paths, each associated with one of the plurality of baseband signals;

adjusting a frequency of the error signal on each of the plurality of paths based on the respective frequency information to shift the error signal on each of the plurality of paths back to a respective baseband frequency; and subtracting each of the frequency adjusted error signals from a respective one of the plurality of baseband signals to generate a plurality of peak power compensated baseband signals.

2. The method of claim 1, further comprising:

adjusting a frequency of each of the peak power compensated baseband signals using respective frequency information to generate a plurality of peak power compensated, frequency hopping adjusted baseband signals; and combining the plurality of peak power compensated, frequency adjusted baseband signals into a single, multi-band peak power compensated signal.

3. The method of claim 1, further comprising:

filtering each of the frequency adjusted error signals using a scaling factor prior to performing the subtracting.

4. The method of claim 3, wherein the scaling factor is calculated as:

$$scalingfactor = \frac{\sigma(N+M)}{\sum_{i=1}^{N} g_i}$$

where N is a number of the different frequency bands, M is a number of unoccupied carriers between the different frequency bands, $g_i$ is a pass-band voltage gain of an error filter which performs the clipping for the $i^{th}$ one of the different frequency bands associated with a scaling factor of 1, and $\sigma$ is a constant which operates as a performance optimization value.

5. The method of claim 1, further comprising the step of:

treating the plurality of peak power compensated baseband signals as the plurality of baseband signals and repeating the steps of adjusting, combining, clipping, providing, adjusting and subtracting for a number of iterations.

6. The method of claim 1, wherein said frequency information is one of: frequency hopping information and a static list of frequencies.

7. The method of claim 1, wherein the step of receiving further comprises:

receiving, as said plurality of baseband signals, a plurality of baseband signals which have been upsampled to a rate of approximately four times a Nyquist sampling rate associated with a maximum bandwidth of the single, multi-band signal.

8. The method of claim 1, wherein the step of clipping further comprises interpolating, clipping and interpolating again the single, multi-band signal to generate the error signal.

9. The method of claim 8, wherein the step of interpolating, clipping and interpolating again the single, multi-band signal to generate the error signal further comprises the steps of:

providing the single, multi-band signal as a first input signal to a first peak power reduction stage on both a first primary signal path and on a first error signal path;

time shifting said first input signal on said first error signal path by a first predetermined time increment to generate a first time shifted input signal;

generating a first error signal based on a peak power threshold using said first time shifted input signal; and filtering said first error signal to remove out-of-band signal energy and to reverse time shift said first error signal by said first predetermined time increment to generate the error signal.

10. The method of claim 9, wherein said step of time shifting said first input signal further comprises:

fractional rate interpolation of said first input signal to generate said first time shifted input signal having a sample rate of between one to two times a Nyquist rate of said first input signal.

11. The method of claim 1, wherein the step of clipping further comprises:

providing the single, multi-band signal as an input signal to a first stage of peak power reduction processing on both a first primary signal path and on a first error signal path;

generating a first error signal in said first error signal path based on a peak power threshold and said first input signal;

subtracting said first error signal from said first input signal to generate a first clipped input signal on said first primary signal path;

filtering said first clipped input signal to time shift said first clipped input signal by a first predetermined time increment and to remove out-of-band emissions to generate a first time shifted, clipped input signal;

inputting said first time shifted, clipped input signal to a second stage of peak power reduction processing on both a second primary signal path and a second error signal path;

generating a second error signal based on said peak power threshold using said first time shifted, clipped input signal; and filtering said second error signal to remove out-of-band signal energy in said second error signal to generate the error signal.

12. A transmitter configured to reduce peak power of a multi-carrier signal comprising:

a first plurality of tuners configured to receive a plurality of baseband signals and to obtain frequency information associated with each of said plurality of baseband signals and further configured to adjust a frequency of each of the baseband signals using respective frequency information to generate a plurality of frequency adjusted baseband signals;

a first combiner configure to combine the plurality of frequency adjusted baseband signals into a single, multi-band signal;

a clipping unit configured to clip the single, multi-band signal to generate an error signal and to provide the error signal to a plurality of paths, each associated with one of the plurality of baseband signals;

a second plurality of tuners configured to adjust a frequency of the error signal on each of the plurality of paths based on the respective frequency information to shift the error signal on each of the plurality of paths back to a respective baseband frequency; and a plurality of subtractors configured to subtract each of the frequency adjusted error signals from a respective one of the plurality of baseband signals to generate a plurality of peak power compensated baseband signals.

13. The transmitter of claim 12, further comprising:
a third plurality of tuners configured to adjust a frequency of each of the peak power compensated baseband signals using respective frequency information to generate a plurality of peak power compensated, frequency hopping adjusted baseband signals; and
a third combiner configured to combine the plurality of peak power compensated, frequency adjusted baseband signals into a single, multi-band peak power compensated signal.

14. The transmitter of claim 12, further comprising:
a plurality of filters each configured to filter one of the frequency adjusted error signals using a scaling factor prior to performing the subtracting in the plurality of subtractors.

15. The transmitter of claim 14, wherein the scaling factor is calculated as:

$$scaling factor = \frac{\sigma(N+M)}{\sum_{i=1}^{N} g_i}$$

where N is a number of the different frequency bands, M is a number of unoccupied carriers between the different frequency bands, $g_i$ is a pass-band voltage gain of an error filter which performs the clipping for the $i^{th}$ one of the different frequency bands associated with a scaling factor of 1, and $\sigma$ is a constant which operates as a performance optimization value.

16. The transmitter of claim 12, wherein the plurality of peak power compensated baseband signals are treated as the plurality of baseband signals and are fed back into the first plurality of tuners to perform another iteration.

17. The transmitter of claim 12, wherein said frequency information is one of: frequency hopping information and a static list of frequencies.

18. The transmitter of claim 12, wherein the plurality of baseband signals have been upsampled to a rate of approximately four times a Nyquist sampling rate associated with a maximum bandwidth of the single, multi-band signal.

19. The transmitter of claim 12, wherein a clipping unit is further configured to interpolate, clip and interpolate again the single, multi-band signal to generate the error signal.

20. The transmitter of claim 19, wherein the clipping unit is further configured to:
provide the single, multi-band signal as a first input signal to a first peak power reduction stage on both a first primary signal path and on a first error signal path;
time shifting said first input signal on said first error signal path by a first predetermined time increment to generate a first time shifted input signal;
generate a first error signal based on a peak power threshold using said first time shifted input signal; and
filter said first error signal to remove out-of-band signal energy and to reverse time shift said first error signal by said first predetermined time increment to generate the error signal.

21. The transmitter of claim 20, wherein the clipping unit is further configured to fractional rate interpolate said first input signal to generate said first time shifted input signal having a sample rate of between one to two times a Nyquist rate of said first input signal.

22. The transmitter of claim 12, wherein the clipping unit is further configured to:
provide the single, multi-band signal as an input signal to a first stage of peak power reduction processing on both a first primary signal path and on a first error signal path;
generate a first error signal in said first error signal path based on a peak power threshold and said first input signal;
subtract said first error signal from said first input signal to generate a first clipped input signal on said first primary signal path;
filter said first clipped input signal to time shift said first clipped input signal by a first predetermined time increment and to remove out-of-band emissions to generate a first time shifted, clipped input signal;
input said first time shifted, clipped input signal to a second stage of peak power reduction processing on both a second primary signal path and a second error signal path;
generating a second error signal based on said peak power threshold using said first time shifted, clipped input signal; and
filter said second error signal to remove out-of-band signal energy in said second error signal to generate the error signal.

* * * * *